Figure 1:
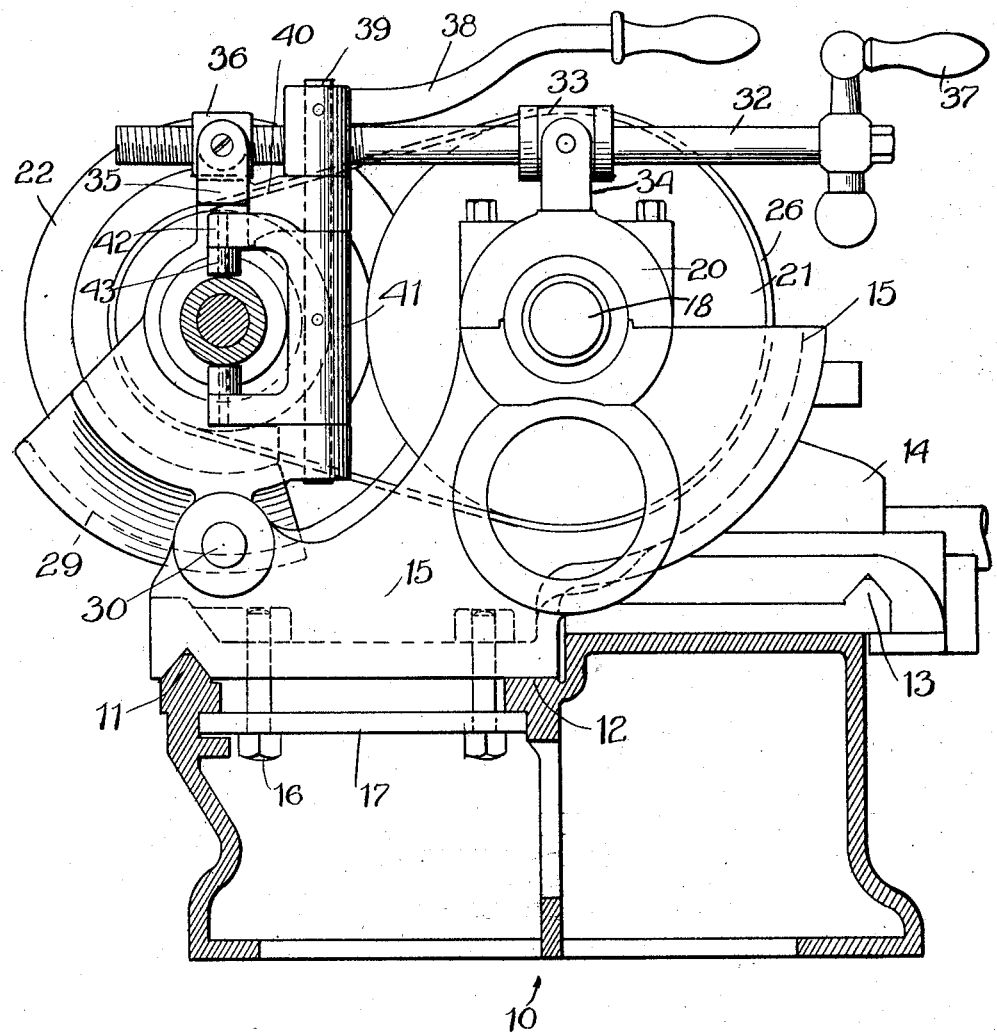

G. D. SUNDSTRAND.
CONE PULLEY HEAD STOCK.
APPLICATION FILED AUG. 23, 1919.

1,387,519.

Patented Aug. 16, 1921.
2 SHEETS—SHEET 1.

Inventor
Gustaf D. Sundstrand
By Miller Chindahl Parker
Attys

G. D. SUNDSTRAND.
CONE PULLEY HEAD STOCK.
APPLICATION FILED AUG. 23, 1919.
1,387,519.
Patented Aug. 16, 1921.
2 SHEETS—SHEET 2.
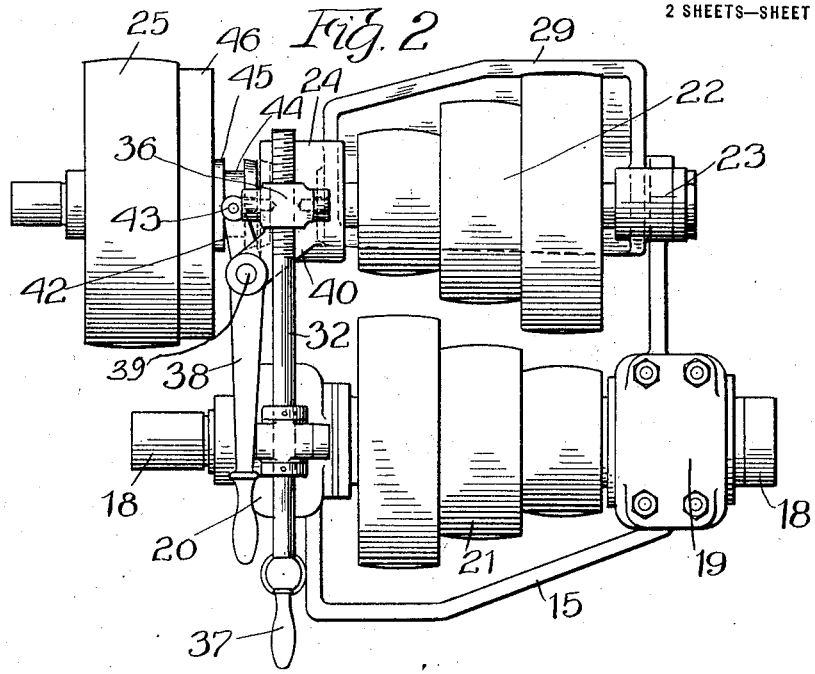
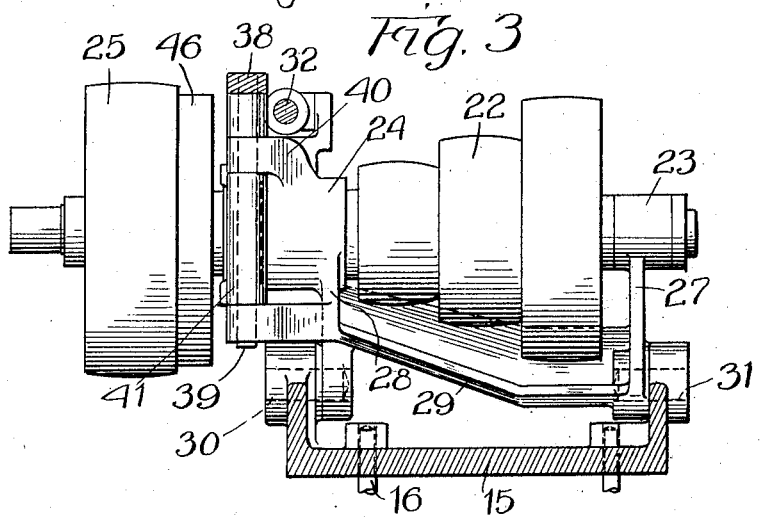
Inventor
Gustaf D. Sundstrand

UNITED STATES PATENT OFFICE.

GUSTAF DAVID SUNDSTRAND, OF ROCKFORD, ILLINOIS, ASSIGNOR TO ROCKFORD TOOL COMPANY, OF ROCKFORD, ILLINOIS, A CORPORATION OF ILLINOIS.

CONE-PULLEY HEAD-STOCK.

1,387,519.  Specification of Letters Patent.  Patented Aug. 16, 1921.

Application filed August 23, 1919. Serial No. 319,308.

*To all whom it may concern:*

Be it known that I, GUSTAF DAVID SUNDSTRAND, a citizen of the United States, residing at Rockford, in the county of Winnebago and State of Illinois, have invented certain new and useful Improvements in Cone-Pulley Head-Stocks, of which the following is a specification.

My invention relates to lathe head stocks and more specifically to an improved head stock embodying a belt transmission for driving the lathe spindle at various speeds. One of the objects of my invention is to eliminate the overhead countershaft in general use in machine shops. These countershafts are expensive to install, inaccessible for purposes of lubrication and repair, and the belts running down from them to the machines below are a source of danger for the workman as well as filling the room with obstructions. I accomplish my object by mounting two cone pulleys in the head stock itself to secure the desired speed variations. Head stocks according to my invention are peculiarly advantageous in connection with double bed lathes having two sets of ways, as the extra width of such a machine will accommodate a wide head stock.

In the accompanying drawings, Figure 1 is an end view of a head stock according to my invention mounted on a double bed with the main drive pulley removed. Fig. 2 is a plan view of the head stock, and Fig. 3 is a side view of the main drive pulley and rear cone, the supporting frame being shown in section.

A device according to my invention comprises a main frame adapted to be suitably mounted on the lathe bed and to carry the main spindle of the lathe which has a cone pulley on it; and a coöperating cone pulley laterally offset from the spindle and adapted to receive power and transmit it to the spindle.

Referring to the drawings, 10 indicates the bed of a double bed lathe having two sets of ways, rear ways 11 and 12, and front ways only one of which appears in Fig. 1 at 13. The main tool carriage indicated as a whole by the reference character 14 slides upon the front ways. My improved head stock is illustrated as mounted upon the rear ways 11 and 12, the main frame 15 thereof carrying suitable bolts 16 and a clamping plate 17 adapted to engage said ways. The main spindle 18 turns in suitable bearings at 19 and 20 and carries a cone pulley 21. The coöperating cone pulley adapted to receive power is indicated at 22 and rotates in bearings 23 and 24 on an axis parallel to the spindle 18, the shaft of said cone pulley extending beyond the bearing 24 to carry a power receiving pulley 25.

The belt 26 transmitting power between the two cone pulleys is so short that it will stretch very little, and if it were kept tight enough to transmit power at all times, it would be almost impossible to shift it. I have provided means for loosening the belt to shift it and for maintaining it properly tight for the transmission of power at all times. The bearings 23 and 24 are formed in upwardly projecting end portions 27 and 28, respectively, at the ends of an auxiliary frame 29 carrying the power receiving pulley 25 and cone 22, said frame being pivoted at 30 and 31 on pintles carried by the main frame 15. Means for rocking the power receiving pulley and cone 22 around the axes 30 and 31 comprise a thrust rod 32 rotatably but non-slidably secured in a short sleeve 33 pivoted on a longitudinal axis on lugs 34 extending up from the bearing 20 for the main spindle. Similar lugs 35 on the bearing 24 carry a nut 36 also pivoted on a longitudinal axis and through which the threaded end of the thrust rod 32 passes. The thrust rod carries a suitable handle 37 for rotating it to tighten the belt for transmitting power or to loosen the belt for shifting it to different pulleys.

I have illustrated a clutch lever 38 adapted to rotate a shaft 39 in lugs 40 extending diagonally from the pivoted frame 29. A central sleeve 41 rotates with the shaft 39 and carries projecting fingers 42 equipped with rollers 43 to engage in the groove 44 of the sleeve 45 which operates the clutch 46. The power receiving pulley, clutch, clutch member, casting 29 and cone 22 all rotate as a unit through small angles to tighten or loosen the belt 26 and are actuated by the thrust rod 32. It will be obvious that any suitable power means may be used to rotate the cone 22 in place of the receiving pulley 25, such, for instance, as an electric motor.

While I have shown and described in detail a specific embodiment of my invention, it should be clearly understood that the description is for purposes of illustration only, that head stocks according to my invention can be mounted on any type of lathe and driven by any suitable power means, and that many variations and modifications of the head stock itself will naturally occur to those skilled in the art. I aim in the subjoined claims to cover all such legitimate modifications and variations.

I claim as my invention:

1. A lathe having, in combination, a bed, spaced ways on said bed, a head stock on said ways, a lathe spindle carried by said headstock and located approximately vertically over one of said ways, a countershaft carried by said headstock and located approximately vertically over the other way, cone pulleys carried by said spindle and countershaft, means for varying the distance between said spindle and countershaft by moving the shaft, and power-receiving means carried by the shaft.

2. A lathe having, in combination, a bed, a head stock on said bed, a lathe spindle and a countershaft carried by said headstock, cone pulleys carried by said spindle and countershaft, means for varying the distance between said spindle and countershaft by moving the shaft, and power-receiving means carried by the shaft.

3. A lathe having, in combination, a bed, a headstock on said bed, a lathe spindle and a countershaft carried by said headstock, cone pulleys carried by said spindle and countershaft, and means for varying the distance between said spindle and countershaft.

4. A lathe having, in combination, a bed, spaced ways on said bed, a headstock on said ways, a lathe spindle carried by said headstock and located approximately vertically over one of said ways, a countershaft carried by said headstock and located approximately vertically over the other way, cone pulleys carried by said spindle and countershaft, and means for varying the distance between said spindle and countershaft by moving the shaft.

5. A lathe having, in combination, a bed, a headstock on said bed, a main spindle in said headstock, a cone pulley on said main spindle, a countershaft and a coöperating cone pulley on said countershaft, and means for delivering power to said countershaft from a suitable source.

6. A lathe having, in combination, a bed, a head-stock on said bed, a U-shaped frame pivoted on said headstock along an axis adjacent its bight and having upwardly extending arms, bearings in said upwardly extending arms, a shaft in said bearings, and a cone pulley on said shaft.

7. A lathe having, in combination, a bed, a headstock on said bed, a U-shaped frame pivoted on said headstock along an axis adjacent its bight and having upwardly extending arms, bearings in said upwardly extending arms, a shaft in said bearings, a cone pulley on said shaft, and power-receiving means carried by said shaft.

8. A lathe having, in combination, a bed, a headstock on said bed, a U-shaped frame pivoted on said headstock along an axis adjacent its bight and having upwardly extending arms, bearings in said upwardly extending arms, a shaft in said bearings, a cone pulley on said shaft, power-receiving means carried by said shaft, a clutch on said shaft, and a clutch lever carried by said U-shaped frame for connecting said power-receiving means and said shaft.

9. A lathe having, in combination, a bed, a headstock on said bed, a U-shaped frame pivoted on said headstock along an axis adjacent its bight and having upwardly extending arms, bearings in said upwardly extending arms, a shaft in said bearings, a cone pulley on said shaft, and power-receiving means carried by said shaft, diagonally extending apertured lugs adjacent one of said bearings, a clutch shaft supported by said lugs in a plane perpendicular to said shaft, a clutch sleeve on said main shaft, and fingers carried by said clutch shaft adapted to engage said sleeve.

10. A lathe having, in combination, a bed, a head stock on said bed, said head stock comprising a main frame, a spindle journaled in said main frame, a cone pulley on said spindle, a countershaft journaled for rotation about an axis parallel to said spindle, a coöperating cone pulley on said countershaft, and means for moving said countershaft and coöperating cone pulley toward and away from said spindle.

11. A lathe having, in combination, a bed, a head stock on said bed, said head stock comprising a main frame, a spindle journaled in said main frame, a cone pulley on said spindle, a pivoted auxiliary frame carrying a countershaft, a cone pulley on said countershaft, and means for rocking said auxiliary frame.

12. A lathe having, in combination, a bed, a head stock on said bed, said head stock comprising a main frame, a spindle journaled in said frame, a countershaft, power means for rotating said countershaft, a clutch and clutch lever carried by said countershaft, coöperating pulley means on said countershaft and said spindle for the transmission of power, and means for moving said countershaft and the associated clutch, clutch lever, and pulley means bodily toward and away from said spindle.

13. A lathe having, in combination, a bed, a head stock on said bed, said head stock having, in combination, two coöperating cone pulleys and means for varying the distance between the axes of rotation of said pulleys.

14. A lathe having, in combination, a bed, a head stock on said bed, said head stock having, in combination, three elements pivoted on parallel triangularly spaced axes, one of said elements being carried by another of said elements whereby rotation of said last-mentioned element around its pivotal axis will vary the distance between the axes of the other two elements.

15. A lathe having, in combination, a bed, a head stock on said bed, said head stock having, in combination, a stationary frame, and a pivoted frame, coöperating cone pulleys journaled in said frames, and means in the nature of a thrust rod extending between said frames for varying the distance between said cone pulleys.

16. A lathe having, in combination, a bed, a head stock on said bed, said head stock having, in combination, a staionary frame, a rotatable spindle in said frame, a second frame pivoted on said stationary frame, a rotatable spindle in said second frame, coöperating cone pulleys on said spindles, a thrust rod rotatably but not slidably mounted on one of said frames, and means in the nature of a screw-threaded nut on the other frame adapted to engage said thrust rod to be operated thereby.

17. A lathe having, in combination, a bed, a head stock on said bed, said head stock having, in combination, a stationary frame, a spindle journaled in said stationary frame, a cone pulley on said spindle, a second frame pivoted on said stationary frame, a spindle journaled in said second frame, a cone pulley on said spindle and a clutch on said spindle adapted to connect said cone pulley to a suitable source of power.

18. A lathe having, in combination, a bed, a head stock on said bed, said head stock having, in combination, coöperating cone pulleys rotating on parallel spaced axes and a clutch adapted to connect one of said cone pulleys to a suitable source of power.

19. A lathe having, in combination, a bed, a head stock on said bed, said head stock having, in combination, spindles rotating on parallel axes, means on one of said spindles adapted to receive power from a suitable source, a belt transmission between said spindles, and means for moving one of said spindles toward and away from the other of said spindles.

20. A head stock having, in combination, a stationary frame, a spindle journaled in said stationary frame, a cone pulley on said spindle, a second frame pivoted to said stationary frame, a spindle journaled in said second frame, means on said second spindle for receiving power and transmitting it to said first-mentioned spindle.

21. A head stock having, in combination, a stationary spindle, a second spindle parallel to said stationary spindle, power receiving means and a cone pulley on said second spindle, and a clutch for connecting said power receiving means and said cone pulley, means for moving said power receiving means, clutch, cone pulley, and second-mentioned spindle bodily as a unit toward and away from said first-mentioned spindle, and a cone pulley on said first-mentioned spindle.

22. A lathe having, in combination, a bed, a head stock on said bed, said head stock having, in combination, a stationary frame having a laterally extending portion, an upwardly extending frame pivoted on said laterally extending portion, spindles journaled on parallel axes in said stationary frame and in said pivoted frame respectively, cone pulleys on said spindles, sleeve-like members carried by said stationary frame and said pivoted frame respectively, and a thrust rod having rotatable but not slidable connection with one of said sleeve members, and a screw-thread connection to the other of said sleeve members.

23. A lathe having, in combination, a bed, a head stock on said bed, said head stock having, in combination, a U-shaped frame pivoted along an axis adjacent its bight and having upwardly extending arms, bearings in said upwardly extending arms, a spindle in said bearings and a cone pulley on said spindle.

In testimony whereof, I have hereunto set my hand.

GUSTAF DAVID SUNDSTRAND.